United States Patent Office 2,999,112
Patented Sept. 5, 1961

---

2,999,112
2,4-DINITROPHENYL HYDRAZONE OF TRINITROPENTANONE
Robert H. Saunders, West Chester, Pa., assignor, by mesne assignments, to the United States of America as represented by the Secretary of the Navy
No Drawing. Filed May 7, 1952, Ser. No. 286,605
1 Claim. (Cl. 260—566)

This invention relates to a new explosive compound, 2,4,-dinitrophenyl hydrazone of trinitropentanone.

The new compound of the invention is a yellow-orange colored solid which is stable at room temperature. Its properties make its use as an explosive highly feasible. For example, it has an oxygen balance within permissible limits and a sensitivity to impact in the range of that of TNT.

The new compound may be prepared by reacting trinitropentanone with 2,4-dinitrophenyl hydrazine.

Trinitropentanone was prepared by adding nitroform across the double bond of methyl vinyl ketone as follows: 0.8 gram of nitroform, amounting to a slight excess, was added dropwise with stirring to 0.35 gram of methyl vinyl ketone dissolved in 1 milliliter of methanol. After heating for 30 minutes at 60° C. trinitropentanone was precipitated out by water addition as a white product. The material was recrystallized from a methylene chloride-pentane mixture.

This invention is illustrated by the following example, but is not limited thereto:

Example

A slight excess of 2,4-dinitrophenyl hydrazine and 10 milliliters of alcohol were added to 0.221 gram of trinitropentanone and the mixture brought to boiling. 0.2 milliliter of 37% hydrochloric acid was added and the mixture refluxed for 5 minutes. The resultant yellow-orange crystals were filtered off and recrystallized from alcohol-ethyl acetate solution.

The compound has the following formula:

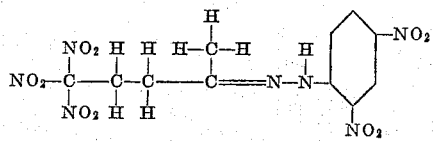

The percentage composition of the compound calculated for $C_{11}H_{11}N_7O_{10}$ is 32.9 percent carbon, 2.7 percent hydrogen, 24.4 percent nitrogen and the remainder oxygen. Analysis of the compound gave, 33.4 percent carbon, 3.5 percent hydrogen and 23.4 percent nitrogen.

The compound has an oxygen balance of −70. Its melting point is 162° C. It has an impact sensitivity of 87, as determined with the Bureau of Mines impact machine, this figure being the distance in centimeters a 2 kilogram weight was required to fall in order to produce 50% shots. The compound gave a time of 5 minutes at 82.2° C. with the potassium iodide-starch stability test.

It is thus seen from the above that there has been provided a new compound having properties making its utility as an explosive highly feasible.

What is claimed is:

2,4-dinitrophenyl hydrazone of trinitropentanone having the following structural formula:

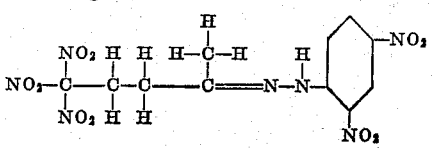

No references cited.